(12) United States Patent
Strobl et al.

(10) Patent No.: US 7,057,318 B2
(45) Date of Patent: Jun. 6, 2006

(54) ELECTRIC MOTOR

(75) Inventors: Georg Strobl, Stuttgart (DE); Benno Blase, Weinstadt (DE); Michel Tennoun, Gerlingen (DE)

(73) Assignee: Johnson Electric S.A., La Chaux-de-Fonds (CH)

( * ) Notice: Subject to any disclaimer, the term of this patent is extended or adjusted under 35 U.S.C. 154(b) by 45 days.

(21) Appl. No.: 10/321,368

(22) Filed: Dec. 18, 2002

(65) Prior Publication Data

US 2003/0173925 A1    Sep. 18, 2003

(30) Foreign Application Priority Data

Dec. 21, 2001    (GB) ................. 0130602.6

(51) Int. Cl.
*H02K 7/08*    (2006.01)
(52) U.S. Cl. .................. 310/90; 310/89; 417/423.7
(58) Field of Classification Search ............... 310/89, 310/90, 40 MM; 417/313, 203, 423, 366, 417/423.7
See application file for complete search history.

(56) References Cited

U.S. PATENT DOCUMENTS

| | | | | |
|---|---|---|---|---|
| 3,873,861 A | * | 3/1975 | Halm ..................... 310/43 |
| 4,508,492 A | * | 4/1985 | Kusakawa et al. .......... 417/366 |
| 4,789,308 A | * | 12/1988 | Tuckey ..................... 417/44.8 |
| 5,040,954 A | * | 8/1991 | Iwai ..................... 417/423.12 |
| 5,053,664 A | * | 10/1991 | Kikuta et al. .............. 310/114 |
| 5,356,272 A | * | 10/1994 | Nagata et al. .............. 417/366 |
| 5,393,206 A | * | 2/1995 | Roth et al. ............... 417/313 |
| 5,399,075 A | | 3/1995 | Frank et al. |
| 5,648,694 A | * | 7/1997 | Kobayashi et al. ........... 310/87 |
| 5,788,210 A | | 8/1998 | Mimura |
| 5,920,437 A | * | 7/1999 | Shirotori ..................... 359/824 |
| 5,961,293 A | * | 10/1999 | Clemmons et al. ........ 417/44.2 |
| 6,025,665 A | * | 2/2000 | Poag et al. .................... 310/89 |
| 6,166,468 A | | 12/2000 | Suzuki et al. ................. 310/90 |
| 6,198,189 B1 | * | 3/2001 | Takahashi et al. ............ 310/89 |
| 6,231,318 B1 | * | 5/2001 | Cotton et al. ............. 417/423.1 |
| 6,333,576 B1 | * | 12/2001 | Ishikawa et al. .............. 310/85 |
| 6,556,645 B1 | * | 4/2003 | Kim ............................. 377/51 |

FOREIGN PATENT DOCUMENTS

| | | |
|---|---|---|
| DE | 31 26 100 A1 | 1/1983 |
| GB | 1 595 818 A | 8/1981 |
| GB | 2 157 766 A | 10/1985 |
| WO | WO 87/07097 A1 | 11/1987 |
| WO | WO- 01/59288 A2 | 8/2001 |

* cited by examiner

*Primary Examiner*—Dang Le
(74) *Attorney, Agent, or Firm*—Birch, Stewart, Kolasch & Birch, LLP

(57) ABSTRACT

An electric motor comprises a stator 13, a rotor 11, windings on tlhe stator, a sleeve 15 at one end of the motor for supporting or defining a bearing for the rotor and for attachment to a fuel pump. The sleeve 15 forms the sole means of aligning the rotor 11 and an impeller of the pump. The motor may be a brushless D.C. motor having sensors for sensing the position of the rotor relative to the stator, electronic circuitry for switching the current in the windings in response to outputs from the sensors so as to cause the rotor to rotate relative to the stator.

5 Claims, 7 Drawing Sheets

US 7,057,318 B2

ELECTRIC MOTOR

FIELD OF THE INVENTION

This invention relates to an electric motor and more particularly but not exclusively to such a motor for use in conjunction with a fuel pump.

According to the present invention there is provided an electric motor comprising a stator, a rotor, and a sleeve at one end of the motor for supporting or defining a bearing for the rotor and for attachment to a fuel pump.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be more particularly described, by way of example only, with reference to the accompanying drawings, wherein.

DETAILED DESCRIPTION OF THE INVENTION

Figure 1:
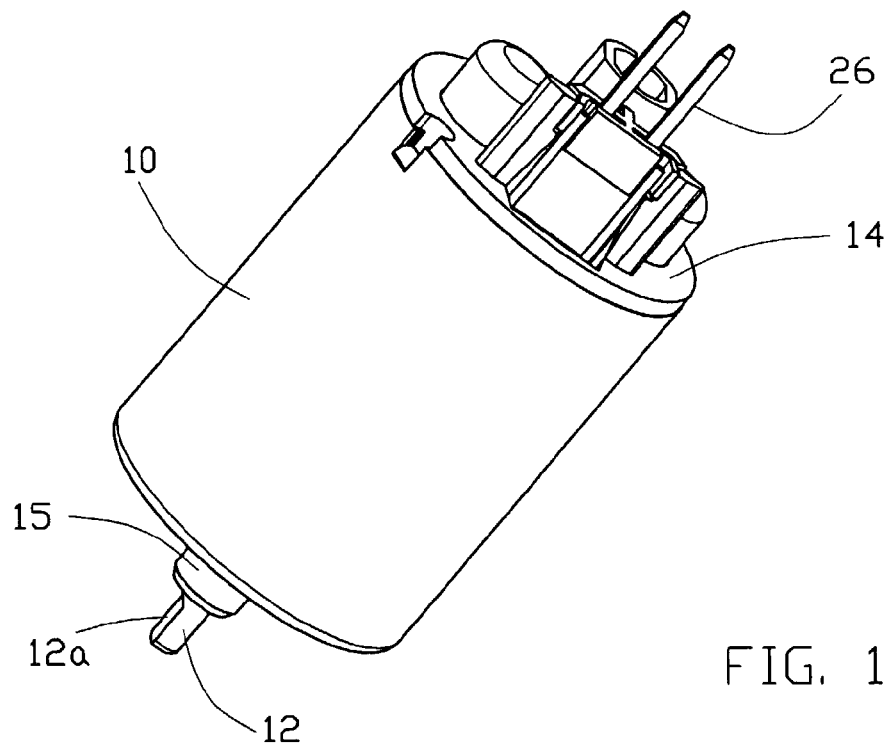
FIG. 1 is a perspective view of one embodiment of an electric motor according to the present invention.
Figure 2:
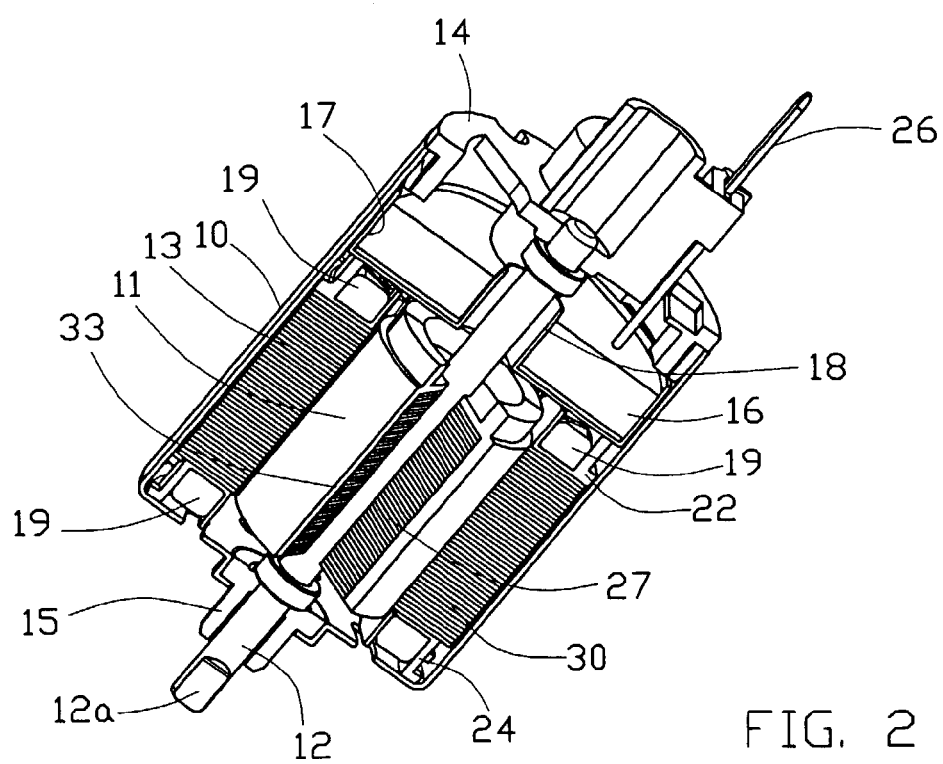
FIG. 2 is a cut away view of the motor shown in FIG. 1.

Referring now to the drawings, the brushless direct current motor shown therein comprises a deep drawn housing 10, a rotor 11 including a shaft 12 having a flat 12a at the end projecting from the closed end of the housing 10, a wound stator 13 surrounding the rotor 11, an end cap 14 closing the open end of the housing 10, and a container 16 within the housing 10 for sensors and electronic circuitry. The wound stator 13 comprises a stator winding 19 wound about a stack of stator laminations 30.

The motor has an overall appearance similar to that of a conventional permanent magnet direct current motor having commutating parts comprising a commutator and brush/leaf system. The motor has particular application as a fuel pump motor, but also has other uses.

Figure 3:
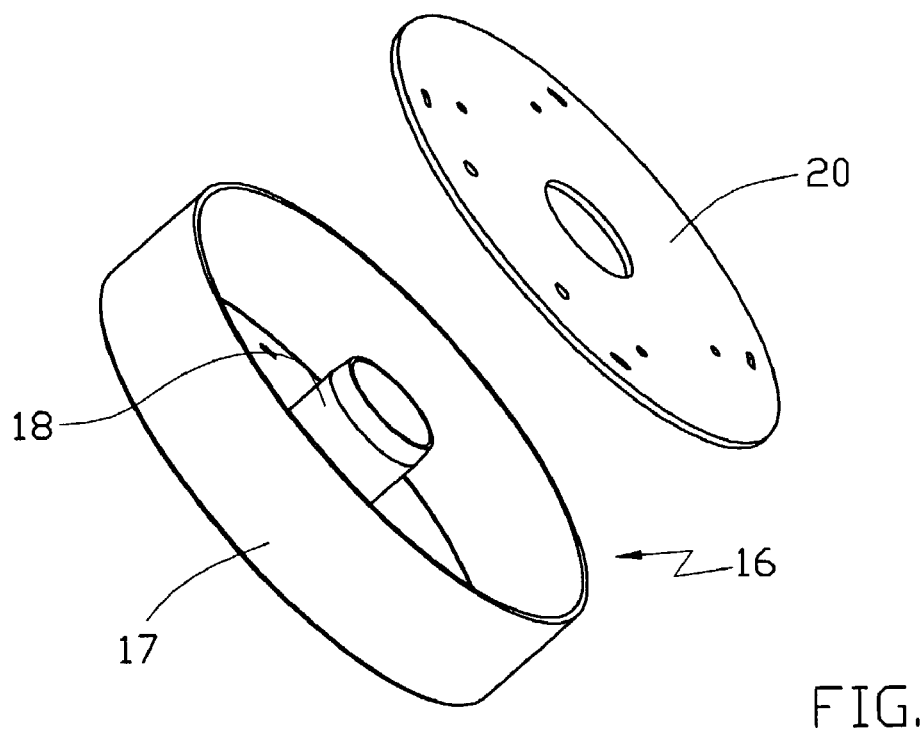
FIG. 3 is a perspective exploded view of the container for containing for electronic circuitry of the motor shown in FIGS. 1 and 2.
Figure 4:
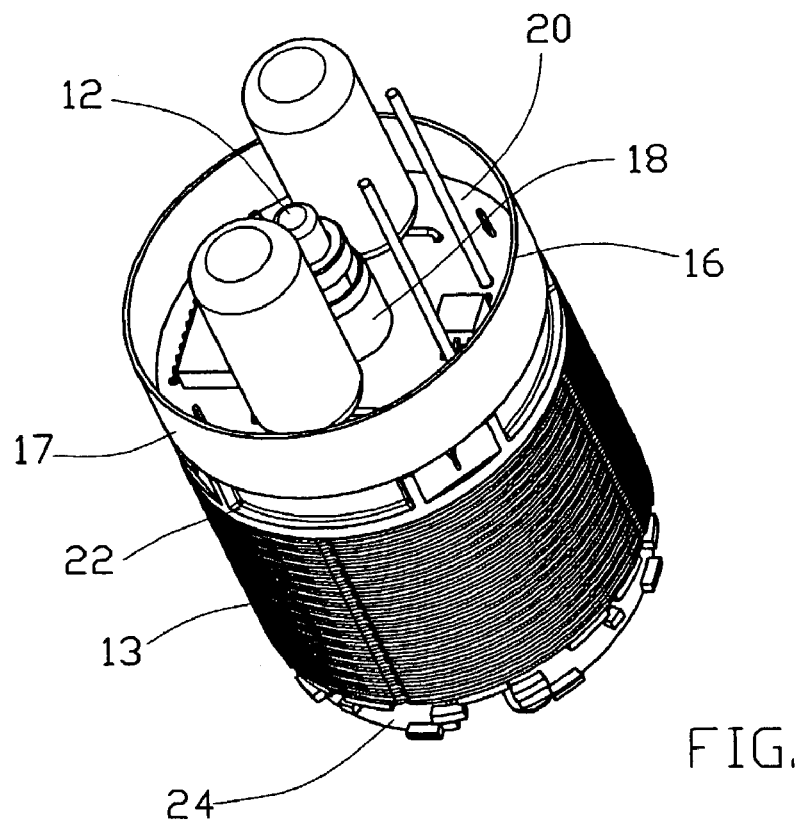
FIG. 4 is a perspective view of the container of FIG. 3 mounted on the stator and containing the electronic circuitry.
Figure 5:
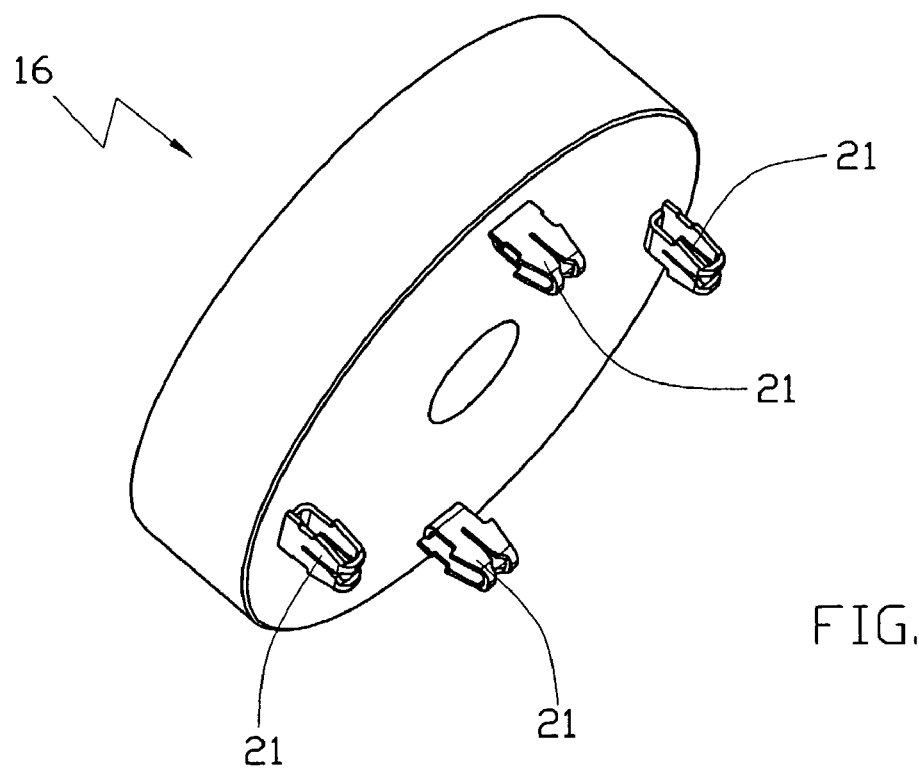
FIG. 5 is a perspective underneath view of the container shown in FIG. 3.

Referring now to FIGS. 3 to 5, the container 16 comprises a cylindrical bowl 17 having an integral sleeve 18 upstanding from the base of the bowl. The container is typically formed of Polyacetal (POM) and contains sensors, typically in the form of Hall-effect sensors, for sensing the position of the rotor 11 relative to the stator 13 and electronic circuitry mounted on an annular printed circuit board 20 which fits over the upstanding sleeve 18. Ideally the Hall-effect sensors lie flat on the printed circuit board 20. This is advantageous as compared to conventional "standing" hall sensors because it is easier to assemble and more reliable against fuel and vibrations after full encapsulation. Also, it allows a reduction in distance between the sensors and the planar top surface of the permanent magnet rotor. The circuitry switches the current in the stator windings in known manner in response to outputs from the sensors to cause the rotor to rotate relative to the stator. The sensors and electronic circuitry are then encapsulated in electrically insulating material, typically epoxy resin, which fills or substantially fills the container 16. The sleeve 18 is dimensioned such as to allow the rotor shaft 12 to extend therethrough and to allow fuel from the fuel pump to flow therethrough.

The sensors and most of the electronic components, including all electrically conductive parts thereof, are fully encapsulated. Only such parts as, for example, electrical terminals and/or large capacitors will not be encapsulated fully.

As shown in FIG. 5, the underside of the base of the bowl 17 has four insulation displacement connectors 21 for direct connection to windings of the stator 13.

The thermal conductivity of the encapsulating material may not be too important because of the cooling effect of fuel passing through the sleeve 18.

Figure 6:
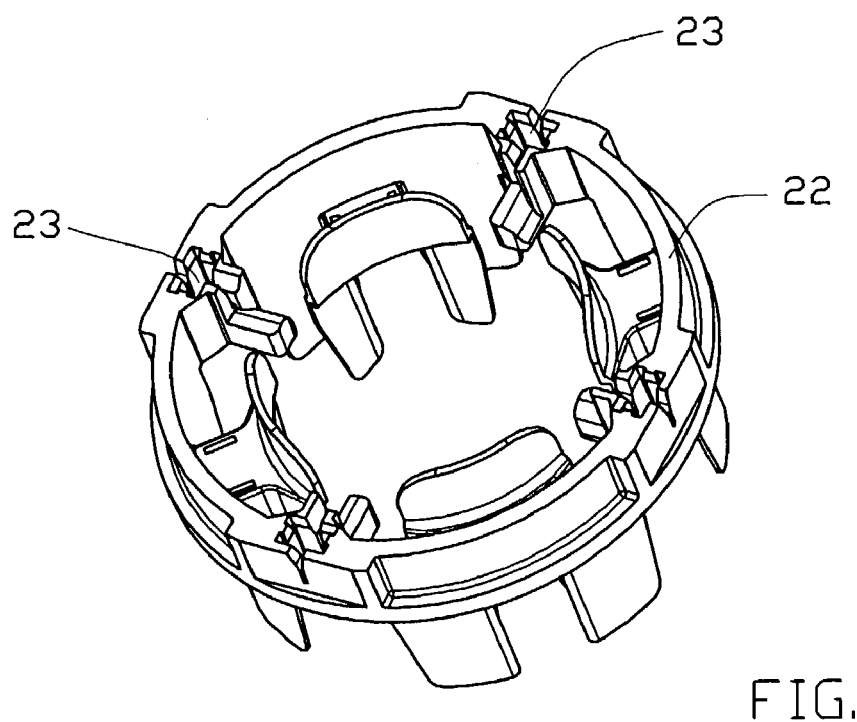
FIG. 6 is a perspective view of a front insulator of the motor.

FIG. 6 shows in detail a front insulator 22 which is placed on the stator and which has the same number of slots 23 (four in this example) for receiving the stator windings and the insulation displacement connections 21 on the container 16.

Instead of mounting the sensors and the electronic circuitry on a printed circuit board, the internal bottom surface of the container 16 could have an electrically conductive pattern imprinted thereon. This can take the form of a heat-press foil applied with a heat-press stamp. All electronic components can then be automatically assembled on the bowl's inner surface and subsequently encapsulated. Another advantage of this technique is a further reduction in the distance between hall sensors and the planar top surface of the rotor magnet resulting in increased magnetic field strength for position detection.

The motor also has a rear insulator 24 similar to but not identical to the front insulator 22.

The end cap 14 is connected to the housing 10 such as by crimping the rim of the housing 10 on the end cap at e.g. two positions. This end cap 14 supports or defines a bearing for the rotor shaft 12 and also includes integral features needed for a customer's fuel pump. A termination 26 is provided on the end cap 14 for connection to an external supply.

A sleeve 15 is provided at the other end of the motor. The sleeve 15 is typically formed of Polyphenylensulfide (PPS). This material has a high heat dimensional stability, low elongation and extremely good resistance against all kinds of aggressive fuels. The sleeve 15 supports or defines a bearing for the rotor shaft 12 and is also for attachment to a customer's fuel pump by press fitting into a hole in the fuel pump housing. Conventionally, the sleeve 15 has been part of the pump housing. It is now a part of the motor and serves the dual purpose of supporting or defining a bearing for the rotor shaft 12 and as a connecting/aligning element for the pump housing and allows the motor to be fully tested before supply to a customer. The sleeve 15 is the sole means of aligning the pump impeller and the rotor 11 of the motor.

The use of a brushless direct current motor as opposed to a conventional commutator motor makes a radial and axial reduction of motor dimensions possible.

Referring now to FIGS. 7 to 11, the rotor comprises a rotor shaft 12 and a laminated core 27 overmolded with material 33 magnetized subsequent to molding.

Figure 7:
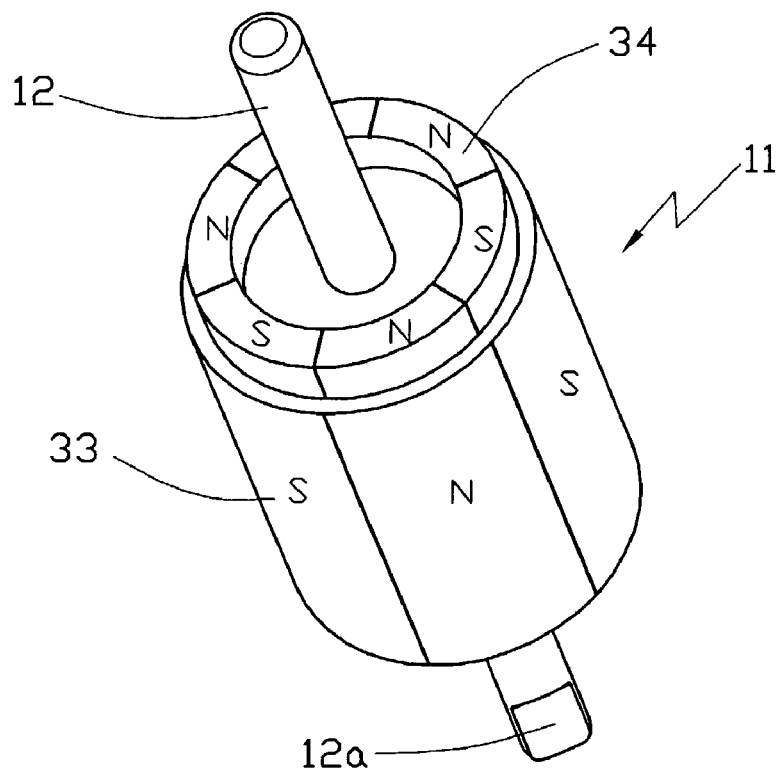
FIG. 7 is a perspective view of the rotor of the motor.
Figure 8:
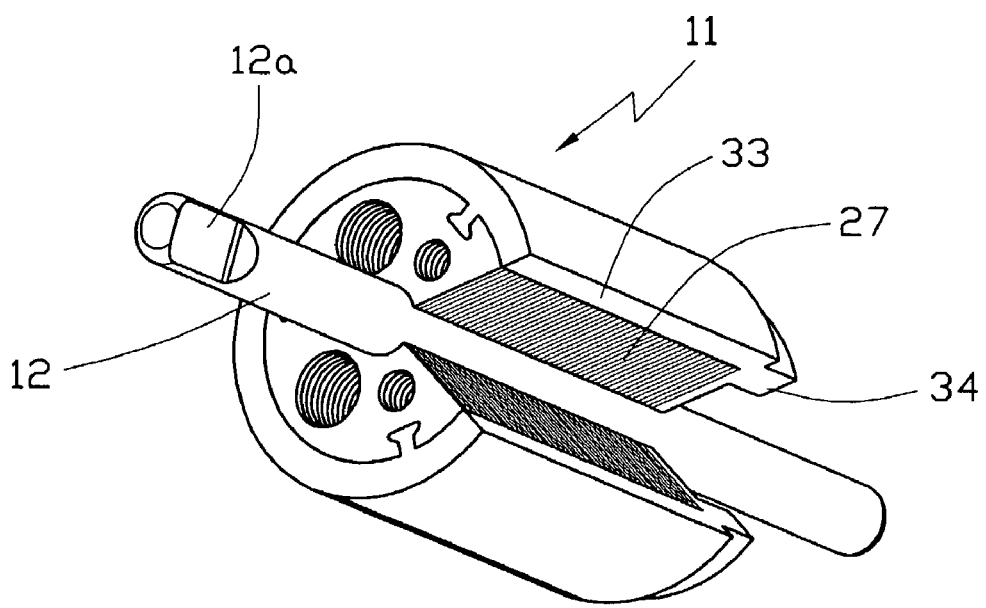
FIG. 8 is a partly broken away view of the rotor shown in FIG. 7.
Figure 9:
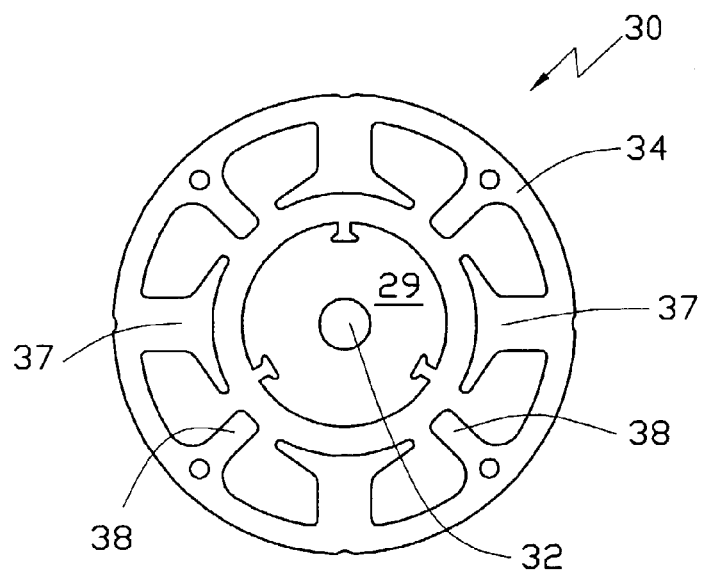
FIG. 9 is a plan view showing the rotor and stator laminations of the motor.

The laminated core 27 comprises a plurality of rotor laminations 29. As shown in FIG. 9, these laminations are stamped from sheet metal and maybe stamped at the same time as stator laminations 30. The rotor laminations 29 have three equi-angularly spaced, radially inwardly extending, slots 31 and a central aperture 32 for mounting the laminations on the rotor shaft 12. A stack of these laminations 30 are overmolded with magnetizable material 33, typically thermoplastical bonded NdFeB compound and this (isotropic) material 33 is magnetized (as shown in FIG. 7) subsequent to molding. The overmolding may also include an integral ring 34 which can be charged like an encoding disc to give a higher magnetic field strength in the axial direction (necessary for the Hall sensors).

A rotor formed in this manner does not require any glue and is simple to assemble. Also no balancing is needed. The molding material 33 also fills the slots 31.

Figure 10:
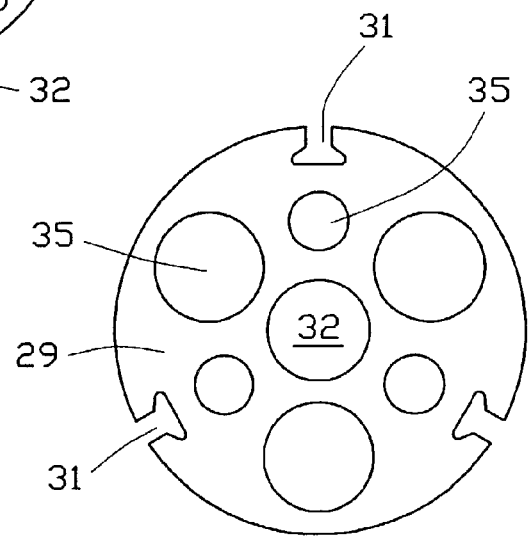
FIG. 10 is a plan view of a second embodiment of a modified rotor lamination.

FIG. 10 shows an alternative rotor lamination having six apertures 35 therein. These apertures 35 are equi-angularly spaced and three of the apertures are larger than the others. This reduces the weight of the rotor core 27 although, preferably, in order to avoid fuel pump rotor punch losses (i.e. losses due to turbulences of rotor in the fluid) the end laminations preferably have no such apertures 35.

Figure 11:
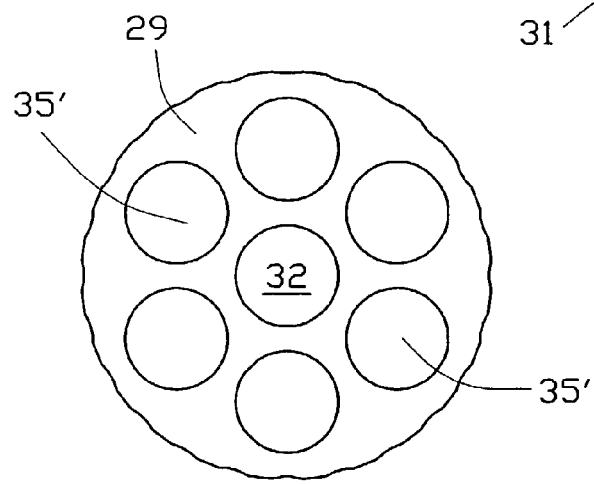
FIG. 11 is a plan view of another modified rotor lamination.

FIG. 11 shows yet a further rotor lamination having no slots 31 but an uneven, knurled peripheral surface and six apertures 35' of equal dimensions.

The stator laminations 30 shown in FIG. 9 are stamped at the same as the rotor laminations and comprise an outer ring 36, four equi-angularly spaced, radially inwardly extending pole pieces 37 around which windings (not shown) are wound and four flux pieces between the pole pieces 37. A stack of these laminations is difficult to wind because of the small gaps between the pole shoes 37 and the flux pieces 38. Also, external coil winding around pole pieces with subsequent insertion onto outer ring is not recommended for small-sized motors.

Figure 12:
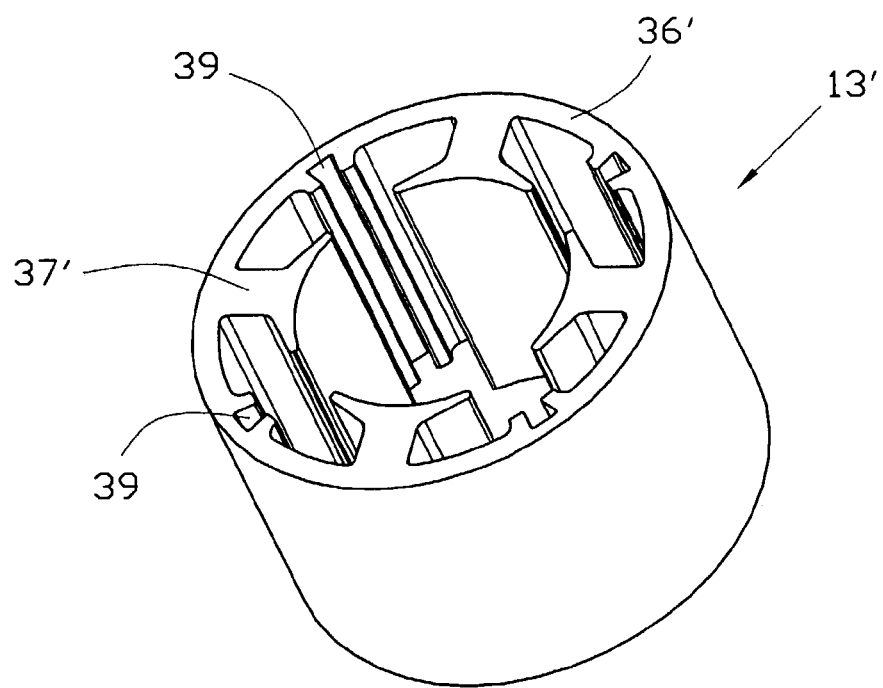
FIG. 12 is a perspective fragmentary view of an alternative stator.
Figure 13:
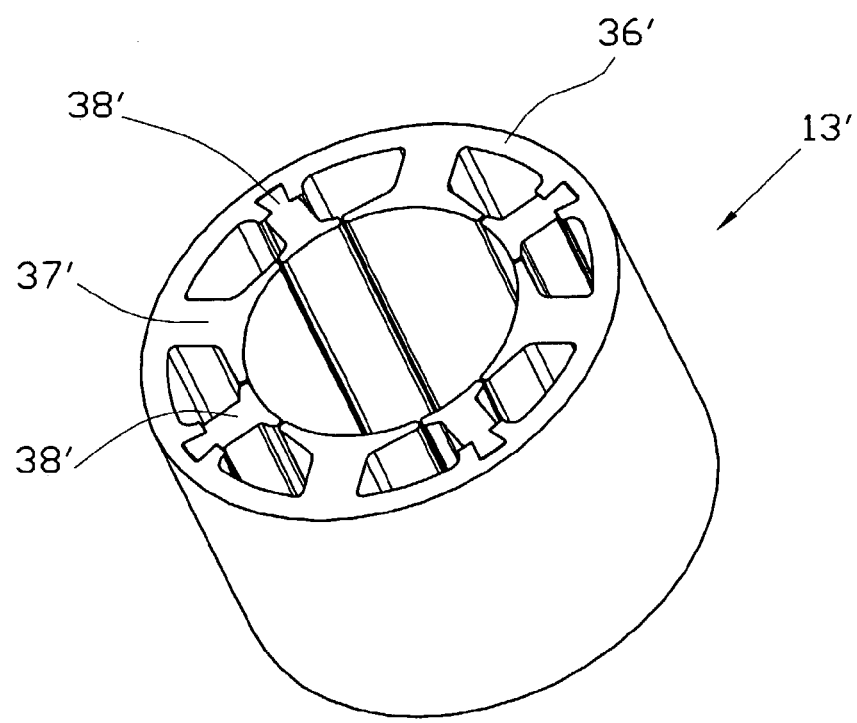
FIG. 13 is a perspective view of the stator shown in FIG. 11 with the flux pieces added.

In one aspect of the invention, and as shown in FIGS. 12 and 13, an alternative stator 13', has an outer ring 36', a plurality of angularly spaced pole pieces 37' extending radially inwardly from the outer ring 36' and a plurality of flux pieces 38' between the pole pieces 37'. The flux pieces 38' are separate from the ring 36' and pole pieces 37' and are slidable into slots 39 defined by the outer ring 36' subsequent to winding of the pole pieces 37'. This simplifies the winding process and allows the flux pieces 38 to be optimally shaped.

The ring 36' and pole pieces 37' are integrally formed and could be formed of stamped laminations secured together such as by laser welding/package punching or more preferably are formed in a unitary construction by molding softmagnetic sintered material.

Figure 14:
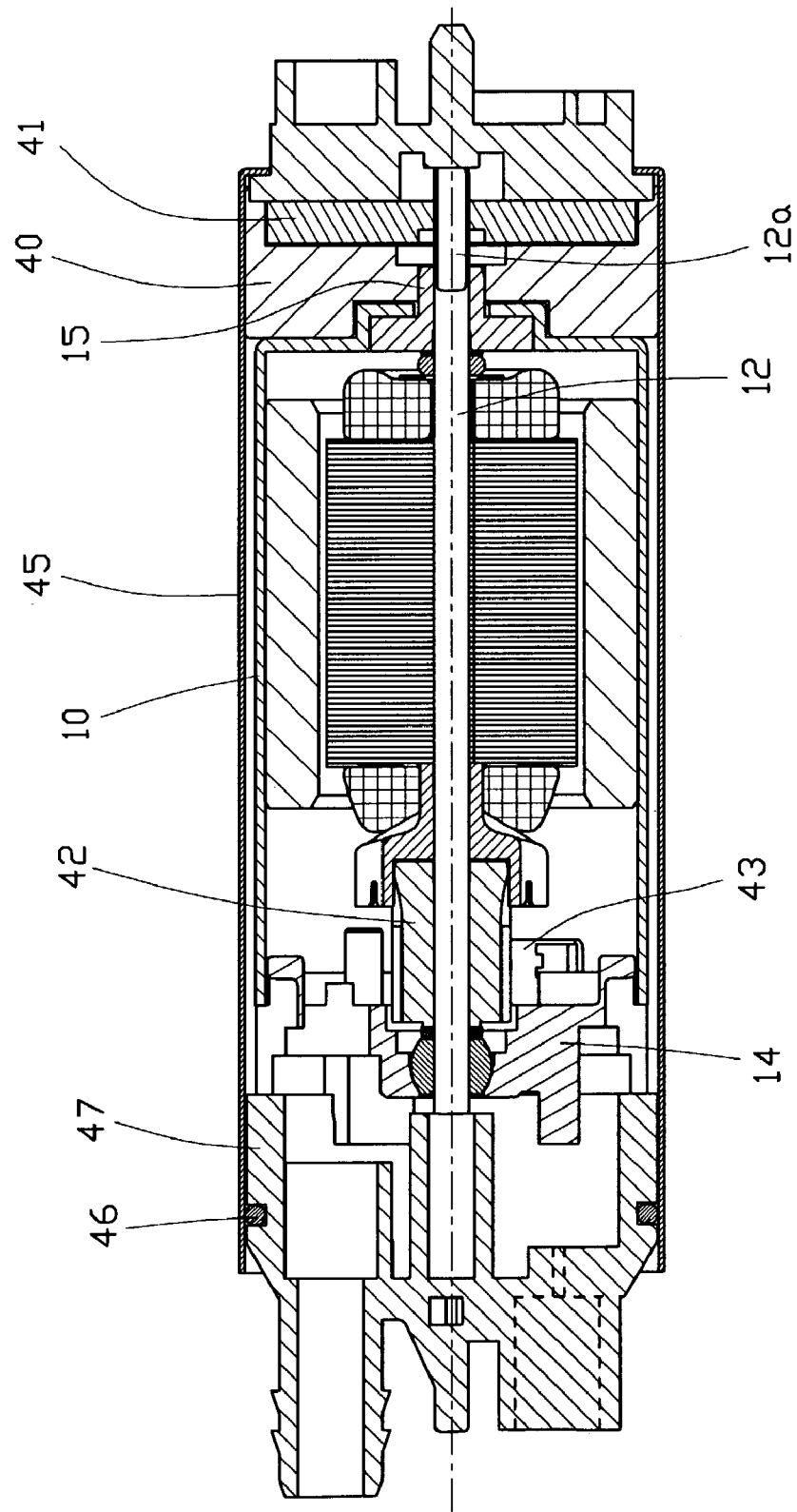
FIG. 14 is a sectional view of another embodiment of a motor according to the invention in combination with a fuel pump.

FIG. 14 shows another embodiment of a motor in combination with a fuel pump 40 having an impeller 41. In this case, the motor is a conventional PMDC motor having a commutator 42 and brush system 43. As shown in FIG. 14 there is an outer housing 45 accommodating the motor and the fuel pump 40. There is a gap between the motor and the outer housing to allow the motor to be aligned with the pump 40 solely by sleeve 15. The pump body is press fitted into one end of the outer housing 45 to form a seal at the pump end of the outer housing and there is an O-ring seal 46 at the other end between an output cap 47 and the outer housing 45. There will be a similar arrangement accommodating the brushless motor of FIGS. 1 to 13 and the fuel pump.

The embodiments described above are given by way of example only and various modifications will be apparent to persons skilled in the art without departing from the scope of the invention as defined in the appended claims. For example, the rotor could surround the stator, more particularly when used as fan motors or storage drives.

What is claimed is:

1. A motor comprising;

a stator, a rotor, windings on the stator, sensors for sensing the position of the rotor relative to the stator, electronic circuitry for switching the current in the windings in response to outputs from the sensors so as to cause the rotor to rotate relative to the stator, a housing including at least one end cap and a rear housing part accommodating the stator the rotor, the sensors and the electronic circuitry, and a bearing sleeve fixed to the housing for supporting the rotor and for attachment to a fuel pump which is outside the housing, wherein the sensors and at least part of the electronic circuitry are encapsulated in an electrically insulating and fuel resistant material in a container within the housing, and wherein the container has an internal sleeve through which a shaft of the rotor extends and through which fuel from the fuel pump can flow.

2. The motor of claim 1, wherein the sleeve forms the sole means of aligning the rotor and an impeller of the pump.

3. The motor of claim 1, wherein the bearing sleeve is of polyphenylensulfide.

4. A motor in combination with a fuel pump having an impeller, the motor comprising a stator, a rotor including a shaft, an end plate at one end of the motor adjacent the fuel pump, and a bearing sleeve fitted to the end plate for supporting the shaft and attaching the motor to the fuel pump, the bearing sleeve being the sole means of aligning the rotor and the impeller, wherein an outer housing accommodates the motor and the fuel pump and a motor housing within the outer housing accommodates the motor, the fuel pump being outside the motor housing, and a gap between the motor and the outer housing to allow for alignment of the motor and the pump.

5. The combination of claim 4, wherein the fuel pump is a press fit in the outer housing to form a seal at the pump end of the outer housing.

* * * * *